Feb. 14, 1961  P. A. C. JACQUIER  2,971,999
GAS-TIGHT COUNTER VOLTAGE CELL OR ALKALINE
STORAGE BATTERY AND METHOD OF MAKING SAME
Filed Jan. 27, 1958  3 Sheets-Sheet 1
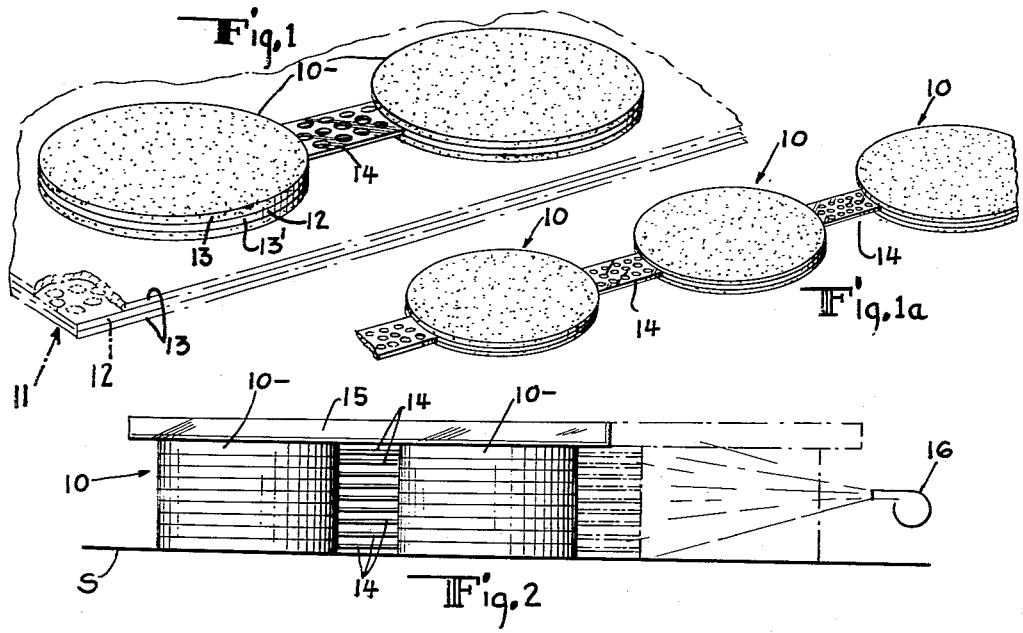
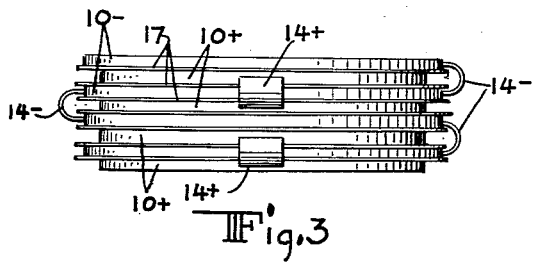
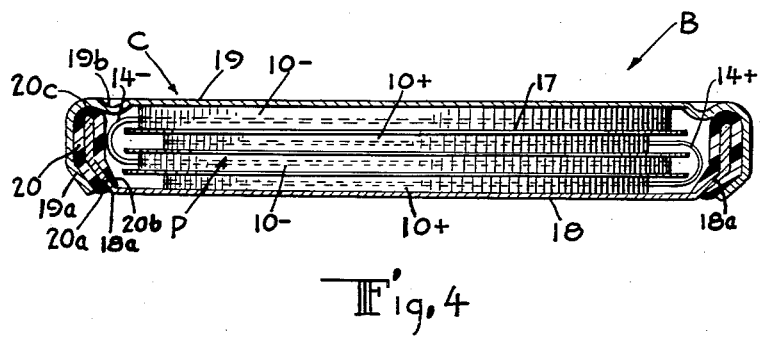
INVENTOR
PIERRE A. C. JACQUIER
BY
ATTORNEYS INVENTOR
PIERRE A. C. JACQUIER
BY
Kenyon & Kenyon
ATTORNEYS Feb. 14, 1961 P. A. C. JACQUIER 2,971,999
GAS-TIGHT COUNTER VOLTAGE CELL OR ALKALINE
STORAGE BATTERY AND METHOD OF MAKING SAME
Filed Jan. 27, 1958 3 Sheets-Sheet 3

INVENTOR
PIERRE A. C. JACQUIER
BY
Kenyon & Kenyon
ATTORNEYS

United States Patent Office 2,971,999
Patented Feb. 14, 1961

2,971,999

GAS-TIGHT COUNTER VOLTAGE CELL OR ALKALINE STORAGE BATTERY AND METHOD OF MAKING SAME

Pierre A. C. Jacquier, Paris, France, assignor to Societe des Accumulateurs Fixes et de Traction (Societe Anonyme), Romainville, France, a company of France Filed Jan. 27, 1958, Ser. No. 711,263

Claims priority, application France Jan. 28, 1957

23 Claims. (Cl. 136—6)

This invention relates to alkaline storage batteries and to methods of making them.

It is already well known that gas-tight counter voltage cells or alkaline storage batteries may be manufactured by using microporous electrode plates and particularly sintered electrode plates, by placing thin diaphragm-like separators between the said plates, and by tightly pressing the opposite sides of the said plates against the interposed separators.

Objects and features of this invention are the provision of novel methods of manufacturing cells or batteries of these types and of providing novel simplified internal construction thereof whereby assembly problems are greatly simplified and production costs are reduced materially as compared with problems and costs of producing cells and batteries of those types presently extant.

According to one embodiment of the invention, each cell individually or in a storage battery comprises two sets of alternately piled up plates, each of said sets of plates being preferably made of one piece, folded up accordionwise and cut or otherwise severed from a sheet composed of a preforated or grid-like metal base covered on both sides with even layers of sintered metal, in such a way that two successive plates of the same set are united by a strip comprising an integral small uncovered section of the said base, said strips as well as the plate edges being coated with a layer of insulating material such as synthetic or natural varnish, gum, resin or the like.

All the plates of the same set are electrically connected through said integral joining strips. However, the said strips, being coated with an insulating material, take no part in the electrochemical reactions within the cell.

In a less advantageous way, it is also possible to provide an electrical connection between the plates of the same polarity in each cell by the use of metal straps secured to such plates, said straps and the plate edges being, as already described, coated with an insulating material.

The plates of the same set, being all alike, may have any suitable contour, outline or shape. Preferably, the negative plates, of the same shape as the positive plates, have a sligthly larger area, so that when assembled with positive plates they overlap the positive plates preferably uniformly around their entire peripheries. Moreover, the negative plates may be thicker than the positive plates.

In this way, the negative plates are endowed with a higher capacity than the positive plates, so that during cell functioning, the evolvement of hydrogen begins later, and moreover, the free oxygen which could escape from between the plates, can be fixed by the overlapping portions of the negative plates.

In an advantageous embodiment of the invention, the assembled plates and separators forming a storage battery are enclosed in a metal casing made of two metal parts separated electrically by a fluid-tight insulating gasket, the said parts of the casing functioning as terminals of the battery, the negative end plate and the positive end plate of the two sets of plates being respectively in electrical contact with the internal faces of the said parts.

In a further advantageous embodiment of the invention possibly imperfect electrical contact between the end electrode plates and respective metallic casing parts is eliminated by the provision of a specially constructed pressure biasing member located appropriately internally of the assembled casing parts to mtaintain a permanent pressure bias on the assembled plates to insure effective functioning of the metal casing parts as respective terminals of the battery, and also permit sealing of the metal casing parts because evolution of gas during cell functioning within the casing is maintained at safe levels.

Further features and objects of the present invention are the provision of novel separators particularly adapted for utilization with electrode plates of the character herein mentioned to facilitate the assembly of cells and batteries of the type herein contemplated.

Still other objects and features of the invention are the provision of novel gas tight alkaline cells and storage batteries that are simple to assemble and use and which may be produced at materially lower cost than that required for presently known cells and batteries of the type in question.

Other objects and features of the invention will become apparent from the following specification and the accompanying drawings wherein:

Figure 1 is a perspective view illustrating diagrammatically a set of two electrode plates, embodying features of this invention;

Figure 1a is a similar perspective view of a set of three such electrode plates;

Figure 2 illustrates diagrammatically a process for applying a coating of insulating material to required portions of the individual sets of plates in a pile of such sets and thereby enhancing production speed in preparation of the sets;

Figure 3 is a diagrammatic elevational view of an assembly of positive and negative electrode plate sets arranged as they would be for practicing this invention;

Figure 4 is a sectional view of a completed storage battery embodying the invention;

Figure 5:
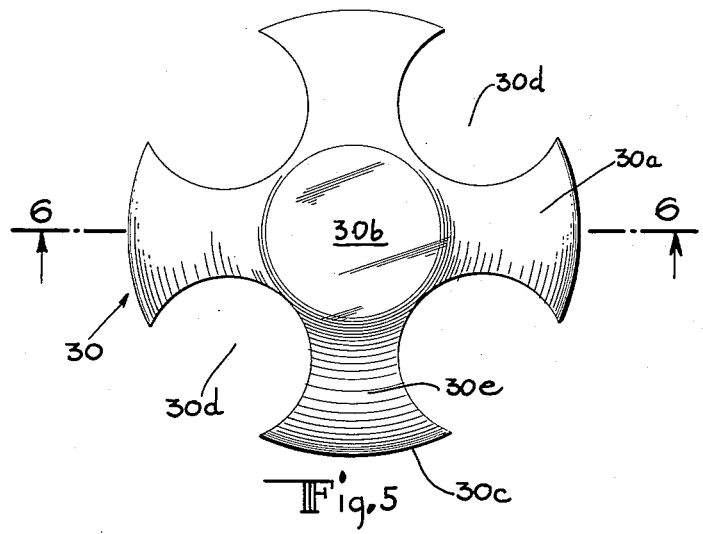
Figure 5 is a plan view of a preferred form of pressure biasing member useful in practicing the invention.

Referring to the drawing and first to Figure 1, electrode plates 10— of one set (e.g. negative electrodes) are cut or stamped or otherwise severed from a sheet 11 of negative electrode material constituted by a perforated metal foil 12 coated with sintered metal 13 on both sides.

In the embodiment shown in the Figure 1, the two plates constituting a set are circularly-shaped and are linked by a joining strip 14. This strip 14 is simply a portion of the foil 12 from which sintered metal has been removed. It is also possible in the same way to produce a string of many electrode plates 10 as seen in Figure 1a joined by strips 14.

After the sets of plates are severed from a sheet 11, the sintered metal layers are scraped from surfaces of the strips 14 so that the base or foil of the sheet 11 from which the plates have been cut is bared in the strips 14. The said base or backing 12 preferably is a thin perforated metal foil but it may be a metal grid or screen of selected mesh size. The electrode sheets 11 themselves may be prepared by known processes such as those disclosed in Salauze U.S. applications Serial Nos. 415,747; 415,748; and 415,749, all filed March 12, 1954, now respectively U.S. Patents 2,820,077, 2,819,962, and 2,820,078, or Vogt Patent No. 2,681,375. They also may be prepared by any other method producing sintered metal coated sheets of electrode material useful for the production of cells and of storage batteries of the type herein contemplated. The sheets as manufactured may include either negative electrode material or positive electrode material or they may be treated after they are manufactured to assume negative or positive electrode characteristics as required or desired.

The procedure thus far described of preparing sets of plates 10— of negative electrodes is followed identically in preparing sets of plates 10+ of positive electrodes.

The electrode sets of plates 10 of each kind thus obtained are then respectively piled up as shown in Figure 2 to any desired height upon a plane surface S. The upper surfaces of the plates 10—, for example, of the topmost set are then covered completely as by a weighted plate 15 or other weighted member having a plane lower surface that will rest on the upper surfaces of all the plates 10— of the uppermost set. As a result, it will be noted that only the peripheral edges of the plates 10— in the pile and the surfaces of the strips 14 are exposed.

A mist of insulating material such as natural or synthetic varnish of any suitable character is then sprayed, for example, by a spray gun 16, directly toward the pile. In this way, only the peripheral edges of the plates in the pile become coated with the insulating material, along with both faces and edges of the strips 14 in the pile because the latter have been freed of the sintered metal by scraping as hereinabove described and consequently lie spaced from each other so that mist can penetrate the voids between strips and coat all portions of the strips.

Upon completion of spraying, the coating applied to the piled sets is allowed to dry or set in situ as deposited by the spray. If desired, drying and/or setting may be hastened by heat in conventional ways. The insulating material thus deposited preferably should be pliant in its dried or set state so that it will not break or crack or strip from the locations to which it has been applied when the individual sets of plates are separated and subjected to succeeding operational steps in assembly of the batteries in which they are used.

After the coating that has been applied to the piled sets of plates has been dried or otherwise set, two sets of plates of opposite polarity, that is, a positive set comprising plates 10+ and a negative set comprising plates 10—, are each individually folded in an accordion-like fashion and interleaved in such a way that a positive plate 10+ is always positioned between two negative plates 10— and vice versa. The plates 10+ as indicated hereinabove are of smaller diameter than the plates 10—. Overlapping discs 17 of a larger diameter than the plates 10+ or 10— are positioned between all the opposing faces of the respective plates 10+ and 10—. These discs 17 are made, for example, of cellulosic material and function as separators. These discs or separators may be made in accordance with the processes and of the materials disclosed in my co-pending application, S.N. 653,314, filed April 17, 1957, now Pat. No. 2,930,829, and in other ways, and of other suitable materials.

When the positive and negative sets of plates 10+ and 10— are folded accordionwise as above-mentioned, the connecting straps 14+ and 14—, as seen in Figure 3, provide parallel electrical connection respectively between all the plates of each set. This eliminates the necessity for subsequently joining the individual plates 10+ and 10— together in order to secure battery separation.

The plates, however, may be prepared individually from sintered metal coated sheets by stamping or otherwise into desired shape and subsequently sets of plates may be assembled electrically by individual straps made, for example, of lengths of metal ribbon whose ends may be welded or otherwise united to the plates.

With such procedure, however, the welded or other joints between straps and plates must be such that they will not alter the surfaces of the plates so that intimate contact of said surfaces against the separators can still be obtained. The union of such straps with the plates preferably is effected prior to the insulating coating processes above-described. When such union has been effected, the coating of individual sets of positive and negative plates can be effected in the manner described above with respect to the sets having integral strips 14.

Preferably in the case of storage batteries, the plates 10+ and 10— are cut from sintered metal sheets which have already been impregnated with negative and positive active materials. In the case of counter voltage cells, it is not necessary that the sintered metal sheets be impregnated with active material. In either event, prior to assembling, the plates are saturated with electrolyte and during the accordion folding processes additional droplets of electrolyte are distributed by spraying or otherwise on the surfaces of the discs 17 comprising the separators so that the latter are wetted without excess, that is to say, the wetting of the separators is sufficient to moisten them thoroughly but not make them dripping wet.

It is to be noted from Figures 3 and 4 that the negative plates 10— are dimensioned so as to overlap all the positive plates 10+ and furthermore that the separators 17 are of larger surface area than the plates 10— so that they overlap the negative plates 10—.

It will be noted from Figure 3 that in order to permit the interleaving of the accordion-like folded sets of negative and positive electrode plates 10— and 10+ that the strips 14+ and 14— which respectively link the negative plates 10— and the positive plates 10+ are disposed in different diametrical planes. The two planes are at right angles to each other. It is not essential however, that their disposition be at right angles as long as the two planes are sufficiently apart angularly to permit the interleaving without electrical contact or short circuit between the strips 14+ and 14—.

An assembled pile of sets of positive plates and negative plates with interleaved separators 17 is insertable into any type of fluid-tight casing. Preferably, for example, such casing comprises two conductive parts insulated from each other, one of which will be in contact with the outermost face of an end plate 10— and the other of which will be in contact with the outermost face of an end plate 10+ so that when the conductive casing parts are pressed tightly together against said outermost opposite faces of said plates 10+ and 10— of opposite polarities, intimate contact between the casing parts and the faces of the plates results.

Figure 4 illustrates an embodiment of a small sized storage battery constructed in accordance with the principles just described.

This storage battery B comprises four plates, two being positive plates 10+ and two being negative plates 10—. Each set of these plates, in this instance, includes only one joining strip 14— for the negative plates and 14+ for the positive plates. The pile P made of these plates also includes three separators 17 which may be discs of material as hereinabove described or, if need be, discs of similar material united generally stringwise in the same general manner as the plates of each set. These separators 17 may also be manufactured from materials hereinafter to be described.

The entire pile P is enclosed in a casing C comprising a metal bottom part 18 and a metal lid part 19 which are adapted to be united in a fluid-tight manner and also to be insulated from each other by a gasket 20. This gasket in the embodiment shown has a substantially inverted U-shaped section and when mounted on the bottom part 18 envelopes the peripheral edge thereof. The bottom part 18 also includes a sloping portion 18a on both faces of which the respective leg parts 20a and 20b of the gasket 20 overlie. The peripheral edge 19a of the lid part 19 is turned down against the sloping portion 18a so that it grips the outer leg part 20a of the gasket. This turning down, effected as by crimping, has two advantages. It insures sufficient pressure between the plates 10+ and 10− and separators 17 within the casing so as to maintain the surfaces of the plates intimately in contact with the corresponding adjoining faces of the separators. It also effects functioning of the casing as a kind of autoclave joint. The latter function occurs because if gaseous pressure tends to appear and build up within the casing, the spreading action on the casing parts 18 and 19 by said gases causes a tighter gripping, of the outer leg 20a, of the gasket between the sloping portion 18a and the crimped or turned down portion 19a. The general principles of such construction have been described in my co-pending application Serial No. 642,622, now Pat. No. 2,843,650, filed February 26, 1957.

The tightness of the seal of the storage battery B is a necessary condition for its efficient operation because if a portion of the electrolyte within it should evaporate, or if gases arising from electrochemical decomposition of said electrolyte were to escape from the casing C, the battery would progressively lose its capacity.

As it has already been taught in my said application, Ser. No. 642,622, now Pat. No. 2,843,650, a groove 19b made, for example, by a knurling tool may advantageously be provided in the lid part 19 so that the U-bend 20c of the gasket 20 is lodged in a peripheral portion of the lid. This groove 19b, however, while preferable is not absolutely essential.

With the batteries B of the type just described, on occasion in the manufacturing process, it may be found that the contact between the internal faces of either the bottom part or the lid part and the adjoining surfaces of the end plates of the pile of plates may not be as perfect as desired and necessary. Moreover, on some occasions, a permanent pressure may not be exerted upon the pile in the casing which is sufficient to insure tight intimate contact between the plates and the separators which tight intimate contact as is known in the battery art is a necessary condition for their operation without substantial evolution of gases.

A solution for these difficulties may be provided simply by the interposition of a biasing member, for example, in the form of a spring positioned within the casing between an internal face of one of the casing parts and the pile of plates. The embodiment shown in Figures 5, 6 and 7 includes such a biasing member in the form of a spring 30.

Figure 6:
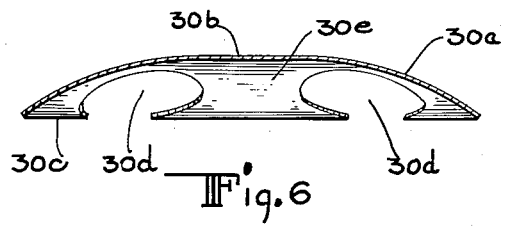
Figure 6 is a section taken along line 6—6 of Figure 5.

This spring 30 is substantially a dish-shaped elastic blade which in section, as seen in Figure 6, has a convex portion 30a and a plane central portion 30b. The peripheral edge 30c of the blade lies in a common plane parallel to the central plane portion 30b.

Preferably, in order to provide increased elasticity for the spring, the convex portion 30a is provided with a plurality of notches 30d. In the embodiment shown, these notches 30d are disposed laterally at equi-spaced locations. In plan, as shown in Figure 5, the spring 30 has generally circular outline, the cutaway notches 30d giving it a cruciform appearance. The notches 30d themselves are preferably disposed at 90° apart positions and are preferably, generally circular in shape, each having an arcuate length somewhat longer than half a circumference of the circle generated by its radius. In this way, the mid-portions 30e of the limbs of the cross are narrower than the outer peripheral edges 30c thereof. The central portion 30b is substantially plane, in contrast of the curvature 30a of the limbs of the cross. Such a blade 30 may be generally defined as a cruciform member with bowed configuration in section, the legs forming the cross being curved in section, while the center area, from which the legs of the cross extend, has plane configuration, the outer or peripheral ends of the legs terminating in a common plane parallel with the plane of said center area.

Figure 7:
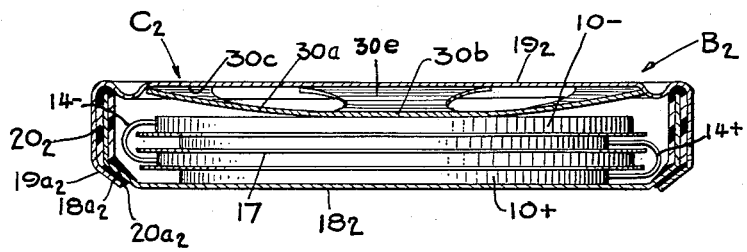
Figure 7 is a sectional view of a storage cell embodying the invention and utilizing the pressure biasing member of Figures 5 and 6.

Figure 7 shows a battery $B_2$ in which such a spring 30 is incorporated. All other parts within the battery $B_2$ except the spring are identical with the parts of the battery B of Figure 4 and are correspondingly numbered. As shown in Figure 7, the spring 30 is positioned within the casing $C_2$ so that its plane surface or area 30b rests upon the uppermost surface of the upper negative electrode plate 10− and the peripheral edges 30c of the spring legs 30 all abut the inner surface of the metallic lid member $19_2$. The lowermost positive electrode $10+$ as in the embodiment of Figure 4, abuts the inner plane surface of the lower part $18_2$ of the casing $C_2$. When the components are assembled in the casing parts $18_2$ and $19_2$ and the edge $19a_2$ is crimped against the gasket leg $20a_2$ on sloping portion $18a_2$ of the bottom part, the spring 30 is flexed deforming its legs from their original unflexed position in opposition to the assembling pressure utilized in crimping the casing parts $18_2$ and $19_2$ together. Since the crimping effects a permanent union of the casing parts, the flexed condition of the spring legs is maintained so that a permanent bias or pressure is maintained by the spring against the electrode plates 10+ and 10− as well as on the interposed separators 17. This permanent elastic pressure of the flexed spring 30 insures intimate contact at all times between all the required surfaces of the plates and separators and also a tight intimate overall engagement between adjoining surfaces. Moreover, the spring blade 30 being of conductive material and being maintained in a deformed state, insures good electrical connection between the casing part $19_2$ and the upper surface of the uppermost electrode plate 10− via the spring. It is to be understood that the spring 30 may be positioned at the bottom of the casing $C_2$ between the lowermost electrode 10+ and the inner surface of the bottom part $18_2$ rather than in the position shown in Figure 7. As a further alternative, a second spring so located may be utilized in conjunction with the spring 30 located shown in Figure 7.

As with the modification of Figure 4, the seal between the casing parts $19_2$ and $18_2$ includes the gas-tight insulating gasket $20_2$ of the same material and same general configuration as gasket 20.

As has been heretofore mentioned hereinabove, the disc-like separators 17 may be of the material and produced as has been described in the aforementioned co-pending Jacquier application Serial No. 653,314, now Pat. No. 2,930,829, filed April 17, 1957, that is to say such separators may be composed of cellulosic fibers disposed in a plurality of substantially parallel layers wherein the fibers are united by a cellulosic binder such as viscose. Moreover, as is described in the said application, the layers thus produced may be joined through at least one other layer of fibers of synthetic material which fibers are either woven or felted or agglomerated by calendering.

In the industrial production of cells or storage batteries, e.g. the batteries B and $B_2$ of small size which are enclosed in substantially circular casing C or $C_2$, it is necessary to prepare a great number of discs for separators each made of fiber layers and said discs have to be superposed at the time of use in proper relationship regarding their fiber content.

Among the features of this invention are the provision of separators 17 generally of the character of the aforesaid application which are especially adapted, however, for use in assembling the small cells or storage batteries of the present invention. In accord with this aspect of this invention, the separators 17 are composed of a layer of cellulosic fibers agglomerated with viscose, sandwiched between two layers of thermoplastic synthetic fibers that have been agglomerated by calendering. The separators 17 of desired dimensions are obtained from the assembled layers by hot punching of discs from a composite sheet of the three superposed layers.

Because of the thermoplastic nature of the two synthetic fibers layers which cover and underlie the cellulosic fiber layer, the outer layers become welded together at their commonly dimensioned peripheries by the hot punching operation. As a result composite separator discs 17 consisting of three layers connected together at their peripheries are secured.

Figure 8:
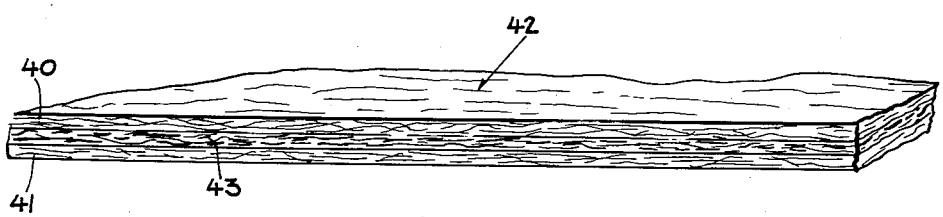
Figure 8 is a fragmentary perspective view illustrating a preliminary step in preparation of separators useful in practicing this invention.
Figure 9:
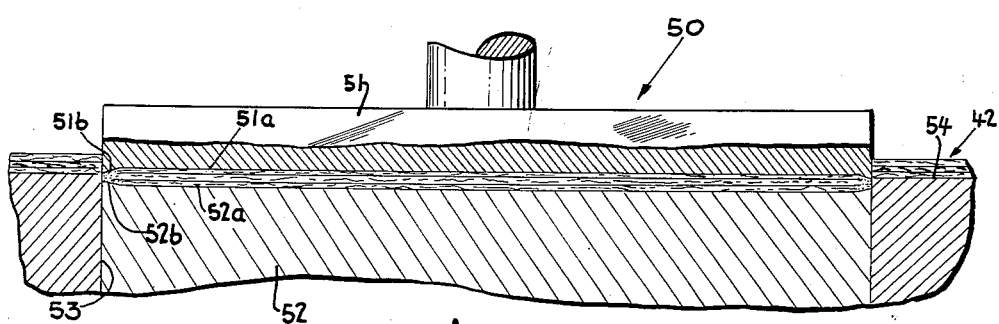
Figure 9 is a diagrammatic illustration of a further step in preparation of said separators.
Figure 10:
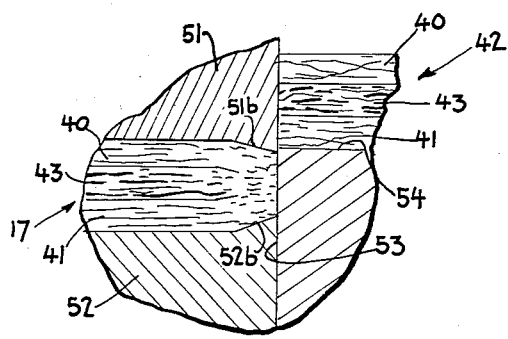
Figure 10 is a similar fragmentary view on an enlarged scale of the step of Figure 9.

Referring now to Figures 8, 9 and 10, which illustrate generally the process of preparing such separators, the two outermost layers 40 and 41 of the composite sheet 42 are each comprised of very thin fibers of a thermoplastic which is not altered by the electrolyte, for example, vinylic and polyamide fibers and other synthetic fibers. The fibers in said layers 40 and 41 are not woven but individual fibers are welded together at crossing points as by hot calendering. As a result, pervious layers 40 and 41 are obtained.

The innermost layer 43 of the composite sheet 42, which is sandwiched between the layers 40 and 41, is comprised of cellulosic fibers, either natural or artificial, which are arranged in layers and agglomerated as by a cellulosic binder such as viscose. Each of the three layers 40, 41 and 43 of the composite sheet 42 is very thin ranging from about 0.1 mm. to approximately 0.3 or 0.4 mm.

Disc-like separators 17 are punched out of the superposed layers 40, 41 and 43, for example, by a heated punching die arrangement 50. This die 50 includes a movable punch part 51 and an ejector part 52 disposed in aligned relationship with reference to a circular die opening 53. The faces 51a and 52a of the respective parts 51 and 52 are complementary in shape having tapered peripheral surface portions 51b and 52b.

The ejector part 52 is normally maintained stationary below the upper surface of the die opening 53 and the composite sheet 42 is positioned on the surface 54 over the die opening 53. The heated punch part 51 is then moved downwardly into the die opening 53 severing the composite separator 17 from the sheet 42. At the same time, because of the tapered nature of the peripheral edges 51b and 52b, the outer peripheral edges of the severed portions 40, 41 and 43 composite disc 17 are compressed as illustrated clearly in Figures 9 and 10 and because of the heat of the die parts 51 and 52 become welded, the heat being sufficient to effect a melting of fibers in the outer layers 40 and 41 for such welding purposes.

When such disc-like separators 17 are utilized in cells or batteries of the character herein described, when the separator is impregnated with an electrolyte such as potassium hydroxide, the cellulosic fibers of the center layer 43 form a gel which fills the pores of the outer layers 40 and 41 and thus come into intimate surface contact with the surfaces of the sintered plates of the cell or battery between which each such separator is interposed.

Since it is essential that such condition of intimate contact between electrode surfaces and surfaces of cellulosic separators be present to eliminate substantial envelopement of gas, separators prepared in the manner just described make possible and permissible the use of a fluid-tight closure and sealing of the casings containing the cells or storage battery elements.

The separators 17 may, of course, be made by other methods and of other suitable materials.

While specific embodiments of the invention have been described, variations in practice within the scope of the appended claims are possible and are contemplated. There is no intention of limitation to the exact details herein shown and described.

What is claimed is:

1. In a sealed alkaline storage battery of the character described, a multipart metallic casing whose parts are insulated electrically from each other, sets of alternately disposed positive and negative electrode plates within said casing, a positive plate of the positive plate set being connected to another positive plate of the same set by a conductive strip coated with an electrolyte-impervious insulating material and united to both, a negative plate of the negative plate set being connected to another negative plate of the same set by a conductive strip coated with an electrolyte-impervious insulating material and united to both said negative plates, independent separators between opposed surfaces of adjacent positive and negative electrode plates, a positive electrode plate being in electrical connection with one of said parts and a negative electrode plate being in electrical connection with another of said parts and the parts thereby providing positive and negative terminals for the battery.

2. A sealed alkaline storage battery of the character described comprising a multipart metallic casing whose parts are insulated electrically from each other, sets of alternately disposed positive and negative electrode plates within said casing, a connector coated with an electrolyte-impervious insulating material and joining a positive plate of the positive plate set to another positive plate of the same set, a connector coated with electrolyte-impervious insulating material joining a negative plate of the negative plate set to another negative plate of the same set, independent separators between opposed surfaces of adjacent positive and negative electrode plates, a positive electrode plate being in electrical connection with one of said parts, and a negative electrode being in electrical connection with another of said parts, and the parts thereby providing positive and negative terminals for the battery.

3. A battery as defined in claim 2 wherein each connector is integral with the plates which it joins.

4. A battery as defined in claim 2 wherein each connector is integral with the plates which it joins and wherein the plates of each set are arranged in accordion-like fashion, and interleaved with plates of the other set.

5. In a sealed alkaline storage battery, sets of alternately disposed positive and negative electrode plates, a positive plate of the positive plate set being joined to another positive plate of the same set by a conductive member coated with an electrolyte-impervious insulating material and united to both, a negative plate of the negative plate set being connected to another negative plate of the same set by a conductive strip coated with an electrolyte-impervious insulating material and united to both said negative plates, independent separators interposed between opposed surfaces of adjacent positive and negative electrode plates and the peripheral edges only of said electrode plates also being coated with said electrolyte-impervious insulating material.

6. A sealed alkaline secondary battery of the compact miniature type comprising a two part metallic casing, means for insulating the parts from each other, sets of alternately disposed positive and negative electrode plates within said casing, a positive plate of the positive plate set being joined to another positive plate of the same set by a conductive member coated with an electrolyte-impervious insulating material and united with both, a negative plate of the negative plate set being connected to another negative plate of the same set by a conductive strip coated with an electrolyte-impervious insulating material and united to both said negative plates, independent separators between opposed surfaces of adjacent positive and negative electrode plates, a positive electrode plate being in electrical connection with a first of said two parts and a negative electrode plate being in electrical connection with the second of two parts, the latter thereby providing positive and negative terminals for the cell.

7. A sealed secondary battery as defined in claim 6 wherein each conductive member is integral with the plates which it joins.

8. A sealed secondary battery as defined in claim 6 wherein the plates of each set comprise a metallic base covered on both surfaces with uniform layers of sintered metal, and wherein each conductive member is an exposed portion of the metallic base of the plates which it unites and free of sintered metal.

9. A sealed alkaline secondary battery as defined in claim 6 wherein the independent separators comprise two layers of synthetic thermoplastic fibers unaltered by the electrolyte and a third layer of porous cellulosic material saidwiched between the two layers, the peripheral edges of said two layers being united together about the peripheral edges of said two layers being united together about the peripheral edge of the third layer.

10. A sealed alkaline storage battery of the character described comprising sets of interleaved positive and negative electrode plates, a positive plate of the positive electrode set being joined to another positive plate of the same set by conductive means coated with electrolyte-impervious insulating material and united to both, a negative plate of each negative electrode set being joined to another negative plate of the same set by conductive means coated with electrolyte-impervious insulating material and united to both said negative plates, each set of plates being arranged in accordion-like fashion with its plates interleaved with plates of a different set and independent separators between opposing surfaces of adjoining plates.

11. The battery of claim 10 including a multipart metallic casing whose parts are insulated from each other and respectively in electrical connection with a plate of different polarity thereby constituting the positive and negative terminals of the battery.

12. That improvement in the process of preparing sets of electrode plates for batteries of the character described comprising providing electrode sheet material and severing sets of electrode plates from such sheet material with a linking strip of the said material between the plates of each set, scraping each linking strip to reduce its thickness to less than its initial thickness, piling sets of plates together in aligned relationship with plates exactly overlying each other and with linking strips also overlying each other but spaced from each other because of the reduced thicknesses of the strips and spraying the piled sets of plates with electrolyte-impervious insulating material to coat the peripheral edges only of the plates and the entire surfaces of the linking strips therewith.

13. A process of preparing separators for batteries of the character described comprising the steps of providing layers of synthetic thermoplastic fibers and a layer of cellulosic material, piling the layers so that the layer of cellulosic material lies sandwiched between the layers of synthetic thermoplastic fibers, and hot punching separators of desired configuration from the piled layers so that the cut edges of layers of synthetic thermoplastic fibers are welded together around the cut edges of the layer of cellulosic material.

14. In a sealed alkaline storage battery of the compact miniature type, a multipart metallic sealed casing whose parts are insulated electrically from each other, sets of alternately disposed positive and negative electrode plates within said casing, a positive plate of the positive electrode set being connected to another positive plate of the same set by a conductive strip united to both, a negative plate of the negative electrode set being connected to another negative plate of the same set by a conductive strip coated with electrolyte-impervious material and united to both said negative plates, separators between opposed surfaces of adjacent electrode plates, a spring member positioned intermediate the interior surface of one of said parts and the outside surface of one of said electrode plates of one of said sets and providing an electrical connection therebetween, the outside surface of one of said electrode plates of the other of said sets being in electrical connection with another of said parts, said spring member being enclosed within said casing and asserting a positive pressure on said plates and separators to insure intimate contact therebetween, said parts thereby providing positive and negative terminals for the battery, each said conductive strip being free of active components of the electrode plates it joins and being coated with an electrolyte resisting insulating material, and the peripheral edges of said electrode plates being likewise coated with said insulating material.

15. The storage battery as defined in claim 14 wherein a second spring member is interposed between the other of said parts and the outside surface of said electrode plates of the other of said sets.

16. The storage battery as defined in claim 14 wherein said spring member comprises a metallic elastic blade having a first plane surface portion, a rounded intermediate portion and an inturned edge portion lying in a second plane parallel with said first plane portion.

17. The storage battery as defined in claim 16 wherein the spring member has cutout portions whereby said spring member has a substantially cruciform shape and increased elasticity.

18. In a sealed alkaline storage battery of the compact miniature type, a multipart metallic casing whose parts are insulated electrically from each other, sets of alternately disposed positive and negative electrode plates within said casing, each positive plate of the positive electrode set being connected to another positive plate of the same set by a conductive strip coated with electrolyte-impervious insulating material and united to both, each negative plate of the negative electrode set being connected to another negative plate of the same set by a conductive strip coated with electrolyte-impervious insulating material, independent separators between opposed surfaces of adjacent electrode plates, a positive electrode plate being in electrical connection with one of said parts, a negative electrode plate being in electrical connection with another of said parts and the parts thereby providing positive and negative terminals for the battery and alkaline electrolyte in said casing saturating the electrode-plates while only wetting the separators.

19. A sealed alkaline storage battery of the compact miniature type comprising a multipart metallic casing whose parts are insulated electrically from each other, sets of alternately disposed positive and negative electrode plates within said casing, a connector coated with electrolyte-impervious insulating material and joining a positive plate of the positive electrode set to another positive plate of the same set, impervious insulating material and joining each negative plate of the negative electrode set to another negative plate of the same set, independent separators between opposed surfaces of adjacent electrode plates, a positive electrode plate being in electrical connection with one of said parts, a negative electrode being in electrical connection with another of said parts, and the parts thereby providing positive and negative terminals for the battery and alkaline electrolyte within said casing in a quantity fully saturating the electrode plates while only moistening the separators so that the volume of electrolyte within the sealed battery is less than the full electrolyte capacity thereof.

20. A sealed alkaline storage battery of the compact miniature type comprising sets of interleaved positive and negative electrode plates, each positive plate of the positive electrode set being joined to another positive plate of the same set by conductive means coated with electrolyte-impervious insulating material and united to both, each negative plate of the negative electrode set being connected to another negative plate of the same set by conductive means coated with electrolyte-impervious insulating material and united to both said negative plates, each set of plates being arranged in accordion-like fashion with its plates interleaved with plates of a different set and independent separators between opposing surfaces of adjoining plates and alkaline electrolyte within said battery fully saturating the electrode plates while only moistening the separators so that the volume of electrolyte within the sealed battery is less than the full electrolyte capacity thereof.

21. A sealed alkaline storage battery of the compact miniature type comprising sets of interleaved positive and negative electrode plates, each positive plate of the positive electrode set being joined to another positive plate of the same set by conductive means coated with electrolyte-impervious insulating material and united to both, each negative plate of the negative electrode set being joined to another negative plate of the same set by a conductive strip coated with electrolyte-imprevious insulating material and united to both said negative plates, each set of plates being arranged in accordion-like fashion with its plates interleaved with plates of a different set and independent separators between opposing surfaces of adjoining plates and alkaline electrolyte within said battery in a quantity which is less than the full absorbing capacities of the electrodes and plates.

22. In a sealed alkaline storage battery of the compact miniature type, a multipart metallic sealed casing whose parts are insulated electrically from each other, sets of alternately disposed positive and negative electrode plates within said casing, each positive plate of the positive electrode set being connected to another positive plate of the same set by a conductive strip uinted to both, each negative plate of the negative electrode set being connected to another negative plate of the same set by a conductive strip united to both said negative plates, independent separators between opposed surfaces of adjacent electrode plates, a spring member positioned intermediate the interior surface of one of said parts and the outside surface of one of said electrode plates of one of said sets and providing an electrical connection therebetween, the outside surface of one of said electrode plates of the other of said sets being in electrical connection with another of said parts, said spring member being enclosed within said casing and asserting a positive pressure on said plates and separators to insure intimate contact therebetween, said parts thereby providing positive and negative terminals for the battery, each said conductive strip being free of active components of the electrode plates it joins and being coated with an electrolyte resisting insulating material, and the peripheral edges of said electrode plates being likewise coated with said insulating material and alkaline electrolyte in said battery fully saturating the electrode plates while moistening the separators without making them dripping wet.

23. In a sealed alkaline storage battery of the compact miniature type, a multipart metallic sealed casing whose parts are insulated electrically from each other, sets of alternately disposed positive and negative electrode plates within said casing, each positive plate of the positive electrode set being connected to another positive plate of the same set by a conductive strip united to both, each negative electrode plate of the negative electrode set being connected to another negative plate of the same set by a conductive strip united to both said negative plates, independent separators between opposed surfaces of adjacent electrode plates, a spring member positioned intermediate the interior surface of one of said parts and the outside surface of one of said electrode plates of one of said sets and providing an electrical connection therebetween, the outside surface of one of said electrode plates of the other of said sets being in electrical connection with another of said parts, said spring member being enclosed within said casing and asserting a positive pressure on said plates and separators to insure intimate contact therebetween, said parts thereby providing positive and negative terminals for the battery, each said conductive strip being free of active components of the electrode plates it joins and being coated with an electrolyte resisting insulating material, and the peripheral edges of said electrode plates being likewise coated with said insulating material and alkaline electrolyte in said battery in a quantity substantially less than the total quantity capable of being absorbed by the separators and plates by the action of capillary forces.

References Cited in the file of this patent
UNITED STATES PATENTS

| | | |
|---|---|---|
| 439,850 | Woolf | Nov. 4, 1890 |
| 706,568 | Kennedy | Aug. 12, 1902 |
| 1,088,210 | Davis | Feb. 24, 1914 |
| 1,548,539 | Martus et al. | Aug. 4, 1925 |
| 2,422,045 | Ruben | June 10, 1947 |
| 2,511,887 | Vinal | June 20, 1950 |
| 2,662,929 | Dague | Dec. 15, 1953 |
| 2,697,737 | Goldberg et al. | Dec. 21, 1954 |
| 2,745,893 | Chubb et al. | May 15, 1956 |
| 2,759,039 | Clark | Aug. 14, 1956 |
| 2,810,006 | Ruben | Oct. 15, 1957 |
| 2,812,376 | Yardney | Nov. 5, 1957 |
| 2,820,078 | Salauze | Jan. 14, 1958 |
| 2,890,261 | Andre | June 9, 1959 |

UNITED STATES PATENT OFFICE
CERTIFICATION OF CORRECTION

Patent No. 2,971,999　　　　　　　　　　February 14, 1961

Pierre A. C. Jacquier

It is hereby certified that error appears in the above numbered patent requiring correction and that the said Letters Patent should read as corrected below.

Column 1, line 36, for "preforated" read -- perforated --; line 56, for "sligthly" read -- slightly --; column 2, line 8, for "mtaintain" read -- maintain --; column 8, line 9, for "eleectrically" read -- electrically --; column 9, line 18, for "saidwiched" read -- sandwiched --; lines 19 and 20, strike out "about the peripheral edges of said two layers being united together"; column 10, line 57, before "impervious" insert -- a connector coated with electrolyte- --; column 11, line 36, for "uinted" read -- united --.

Signed and sealed this 20th day of June 1961.

(SEAL)
Attest:

ERNEST W. SWIDER
Attesting Officer

DAVID L. LADD
Commissioner of Patents